United States Patent
Wu

(10) Patent No.: US 8,614,678 B2
(45) Date of Patent: Dec. 24, 2013

(54) MOUSE WITH ROTATABLE OPERATION MODULE

(75) Inventor: Chun-Che Wu, Taipei (TW)

(73) Assignee: Primax Electronics Ltd, Taipei (TW)

( * ) Notice: Subject to any disclaimer, the term of this patent is extended or adjusted under 35 U.S.C. 154(b) by 560 days.

(21) Appl. No.: 12/938,134

(22) Filed: Nov. 2, 2010

(65) Prior Publication Data

US 2012/0081284 A1    Apr. 5, 2012

(30) Foreign Application Priority Data

Oct. 1, 2010   (TW) ................................ 99133477 A

(51) Int. Cl.
*G06F 3/033*    (2013.01)
*G09G 5/08*    (2006.01)

(52) U.S. Cl.
USPC .......................................... 345/163; 345/156

(58) Field of Classification Search
USPC .................................................. 345/156–173
See application file for complete search history.

(56) References Cited

U.S. PATENT DOCUMENTS

| | | | |
|---|---|---|---|
| 8,330,629 B2 * | 12/2012 | Shimizu et al. .................. | 341/35 |
| 2002/0060663 A1 * | 5/2002 | Wang .............................. | 345/156 |
| 2004/0183782 A1 * | 9/2004 | Shahoian et al. .............. | 345/163 |
| 2004/0196257 A1 * | 10/2004 | Sato et al. ...................... | 345/156 |
| 2008/0010616 A1 * | 1/2008 | Algreatly ....................... | 715/856 |
| 2011/0141018 A1 * | 6/2011 | Du et al. ........................ | 345/163 |

* cited by examiner

*Primary Examiner* — Viet Pham
(74) *Attorney, Agent, or Firm* — Apex Juris, pllc; Tracy M. Heims

(57) ABSTRACT

A mouse with a rotatable operation module is provided. The mouse includes a mouse housing and the operation module. The mouse housing has a sidewall. A hollow portion is formed in the sidewall for installing the operation module. The operation module includes a positioning member, a rotary member and a signal generating module. By rotating the rotary member, the operation module is rotated accordingly.

7 Claims, 8 Drawing Sheets

MOUSE WITH ROTATABLE OPERATION MODULE

FIELD OF THE INVENTION

The present invention relates to a mouse, and more particularly to a mouse with a rotatable operation module.

BACKGROUND OF THE INVENTION

Conventionally, a mouse has a left button, a right button and a middle roller for controlling corresponding application programs of a computer system. Recently, as the functions of computer application programs increase, one or more additional functional keys (e.g. multimedia keys) are installed on a sidewall of the mouse for adjusting sound volume, replacing the functions of some keys of a keyboard, or adjusting a visual angle of a game image.

FIG. 1A is a schematic perspective view illustrating a conventional mouse with lateral functional keys. FIG. 1B is a schematic perspective view illustrating another conventional mouse with lateral functional keys. In FIG. 1A, the functional keys 12A are disposed on a sidewall 11A of the mouse 1A. In FIG. 1B, the functional keys 12B are disposed on a sidewall 11B of the mouse 1B. The relative locations of the functional keys 12A and 12B are different. That is, the functional keys 12A as shown in FIG. 1A are horizontally arranged, but the functional keys 12B as shown in FIG. 1B are vertically arranged. The different ways of arranging the function keys may comply with the usual practices of different users. In other words, the users may select desired mouse devices according to their usual practices. However, in some occasions (e.g. internet bars or the uses of public computers), the user need to use other person's mouse, which often fails to comply with usual practices of the user. As known, it is troublesome for the user to use other person's mouse.

For solving the drawbacks of the mouse devices of FIGS. 1A and 1B, a mouse with a function of adjusting a lateral operation module is disclosed in for example Taiwanese utility model patent No. M356175. FIG. 1C is a schematic perspective view illustrating a conventional mouse disclosed in Taiwanese utility model patent No. M356175. As shown in FIG. 1C, plural functional keys 12C, a slot 13 and a knob 14 are formed at a sidewall 11C of the mouse 1C. By rotating the knob 14, the functional keys 12C may be moved forwardly or backwardly along the slot 13, and thus the positions of the lateral functional keys 12C may be horizontally adjusted. The mouse of FIG. 1C, however, only provides the function of horizontally adjusting the positions of the lateral functional keys 12C. In other words, the mouse of FIG. 1C fails to provide the function of vertically adjusting the positions of the functional keys.

SUMMARY OF THE INVENTION

The present invention provides a mouse with an easy-to-use and rotatable operation module.

In accordance with an aspect of the present invention, there is provided a mouse with a rotatable operation module. The mouse includes a mouse housing and the operation module. The mouse housing has a sidewall. A hollow portion is formed in the sidewall. The sidewall includes an inner surface and an outer surface. The operation module is disposed on the sidewall and penetrated through the hollow portion. The operation module includes a positioning member, a rotary member and a signal generating module. The positioning member is fixed on the inner surface of the sidewall. The rotary member is disposed within the hollow portion and exposed to the outer surface of the sidewall, so that the rotary member is rotatable with respect to the sidewall. The signal generating module is fixed on the rotary member for generating a control signal.

In an embodiment, the positioning member and the inner surface of the sidewall collectively define a receptacle. The rotary member further includes a ring-shaped part. The ring-shaped part is accommodated within the receptacle.

In an embodiment, a retaining post is formed on the inner surface of the sidewall, and the rotary member comprises an arc-shaped slot. The retaining post is penetrated through the arc-shaped slot for confining a rotating angle of the rotary member.

In an embodiment, a convex structure is formed on a radial periphery of the rotary member, a ring-shaped engaging part is formed on the inner surface of the sidewall, and the ring-shaped engaging part has plural concave structures corresponding to the convex structure. By rotating the rotary member to render engagement between the convex structure and one of the concave structures, the rotary member is stayed at a specified position.

In an embodiment, the rotary member further includes a perforation. The signal generating module is exposed to the perforation, so that the signal generating module is operable by a user.

In an embodiment, the signal generating module includes a soft key, a pressure sensitive element and a circuit board. The soft key may be pressed by a user. In response to a pressing action of the user, the pressure sensitive element generates a pressing signal. The circuit board is used for receiving the pressing signal, and generating a control signal in response to the pressing signal. The pressure sensitive element is mounted on the circuit board.

In an embodiment, the rotary member further includes a protrusion for fixing the soft key on the rotary member, so that the soft key is rotatable with the rotary member.

In an embodiment, the rotary member further includes a stud bolt hole, and the circuit board has an opening corresponding to the stud bolt hole. By penetrating a fastening element through the opening of the circuit board and tightening the fastening element in the stud bolt hole, the circuit board is fixed on the rotary member, so that the circuit board is rotatable with the rotary member.

In an embodiment, the signal generating module includes a roller, a rotation sensitive element and a circuit board. The roller may be rotated by a user's finger. In response to a rotating g action of the user's finger, the rotation sensitive element generates a rotating signal. The circuit board is used for receiving the rotating signal, and generating a control signal in response to the rotating signal. The roller and the rotation sensitive element are mounted on the circuit board.

In an embodiment, the rotary member further includes a stud bolt hole, and the circuit board has an opening corresponding to the stud bolt hole. By penetrating a fastening element through the opening of the circuit board and tightening the fastening element in the stud bolt hole, the circuit board is fixed on the rotary member, so that the circuit board is rotatable with the rotary member.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
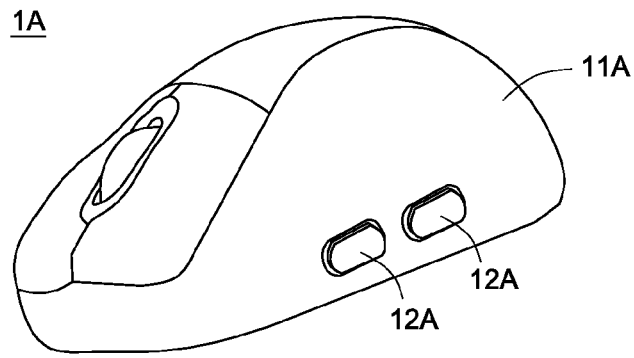
FIGS. 1A, 1B and 1C are schematic perspective views illustrating three conventional mouse devices with lateral functional keys.
Figure 1B:
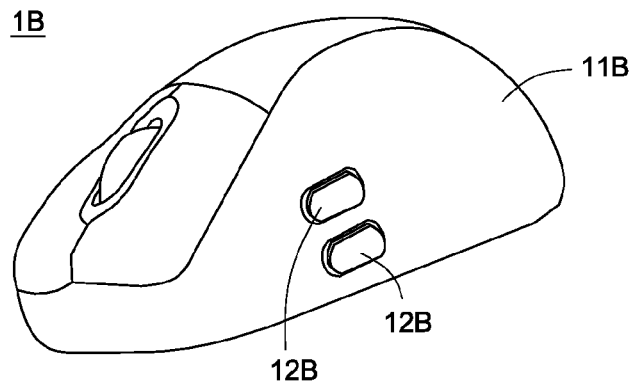
Figure 1C:
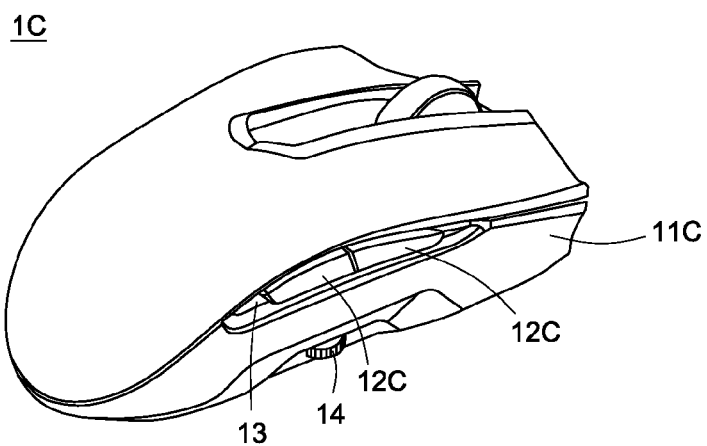
Figure 2:
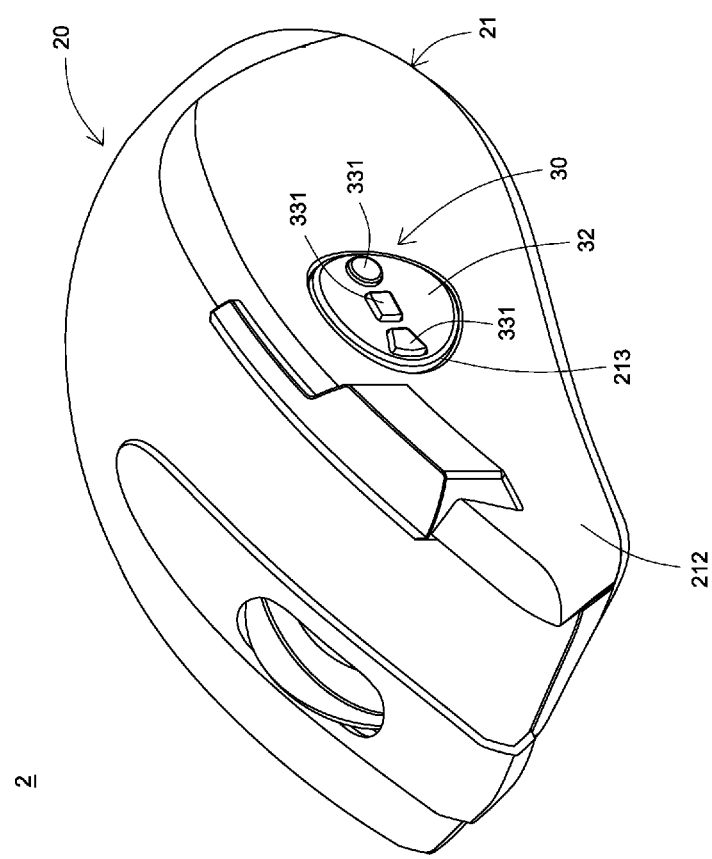
FIG. 2 is a schematic perspective view illustrating a mouse according to a first embodiment of the present invention.
Figure 3:
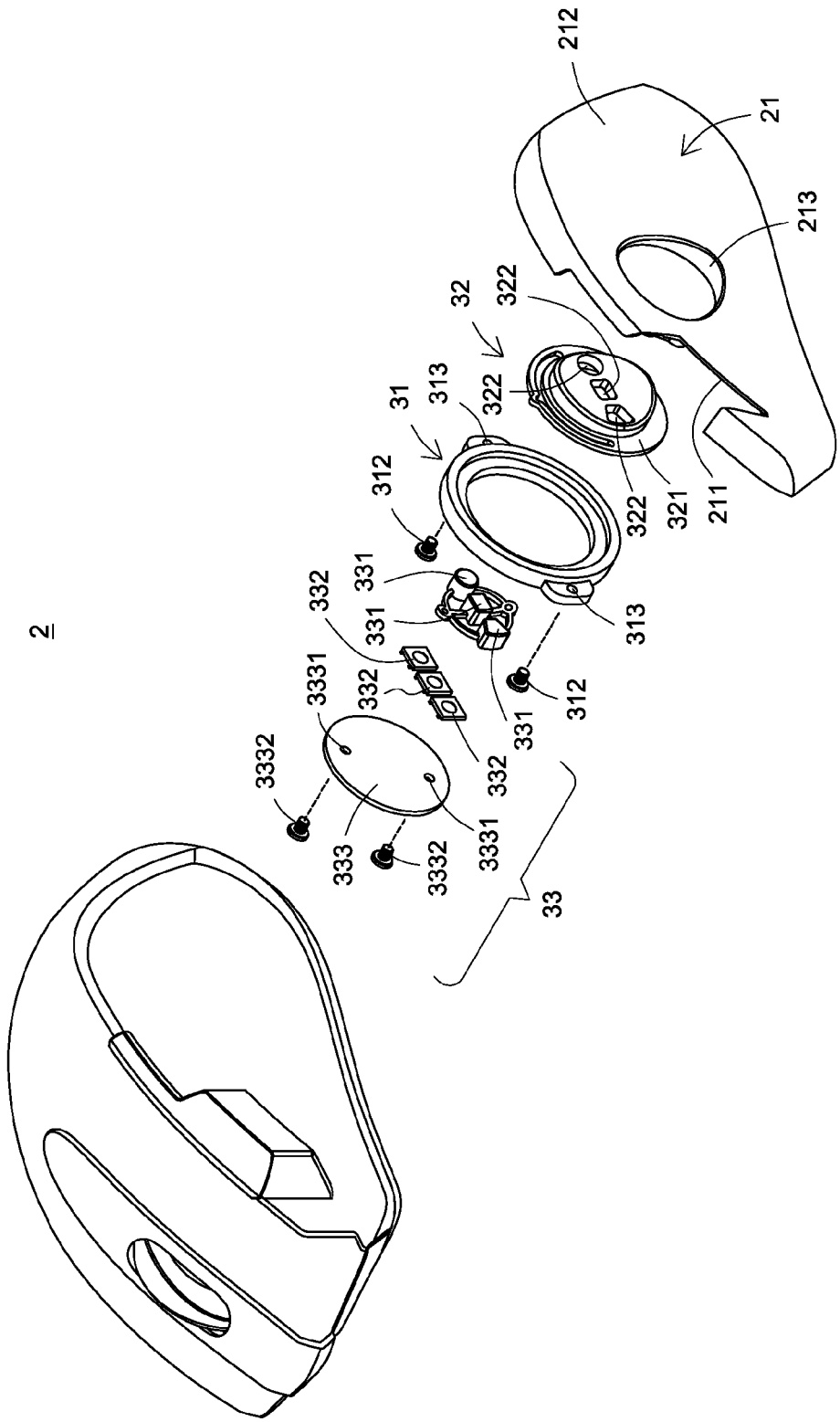
FIG. 3 is a schematic exploded view illustrating a mouse according to the first embodiment of the present invention.
Figure 4:
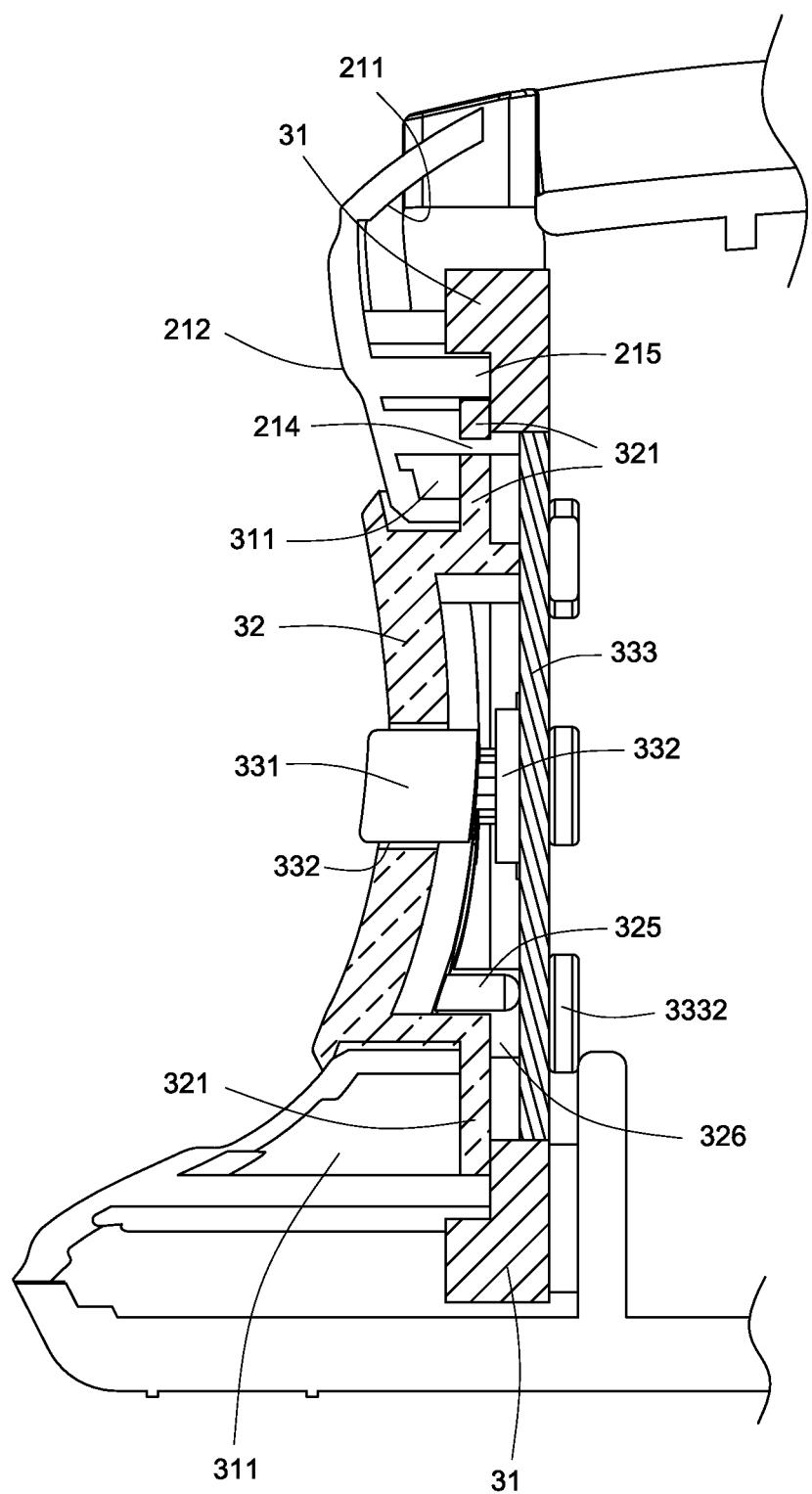
FIG. 4 is a schematic cutaway view illustrating a mouse according to the first embodiment of the present invention.

FIGS. 2, 3 and 4 are schematic perspective, exploded and cutaway views illustrating a mouse according to a first embodiment of the present invention, respectively. As shown in FIGS. 2, 3 and 4, the mouse 2 comprises a mouse housing 20 and an operation module 30. The mouse housing 20 has a sidewall 21. The sidewall 21 has an inner surface 211 and an outer surface 212. In addition, a hollow portion 213 is formed in the sidewall 21. The operation module 30 is disposed on the sidewall 21, penetrated through the hollow portion 213, and exposed to the outer surface 212. The operation module 30 comprises a positioning member 31, a rotary member 32 and a signal generating module 33. The positioning member 31 is fixed on the inner surface 211 of the sidewall 21. Moreover, the positioning member 31 and the inner surface 211 of the sidewall 21 collectively define a receptacle 311. The rotary member 32 is exposed to the outer surface 212 of the sidewall 21, so that the rotary member 32 can be rotated by a user. The rotary member 32 comprises a ring-shaped part 321 and at least one perforation 322. The ring-shaped part 321 is accommodated within the receptacle 311. By the ring-shaped part 321, the rotary member 32 is fixed on a position rotatable with respect to the sidewall 21, but fails to be moved toward the internal potion of the mouse housing 20 in response to a pressing force exerted thereon. The signal generating module 33 is fixed on the rotary member 32. The signal generating module 33 comprises at least one soft key 331, at least one pressure sensitive element 332 and a circuit board 333. The signal generating module 33 is fixed on the rotary member 32, so that the rotary member 32 and the signal generating module 33 are simultaneously rotatable with respect to the sidewall 21. The soft key 331 of the signal generating module 33 is exposed to the perforation 322 of the rotary member 32, so that the soft key 331 can be pressed by the user. In this embodiment, the signal generating module 33 comprises plural soft keys 331, which are exposed to plural perforations 322 of the rotary member 32, respectively. Corresponding to the plural soft keys 331, plural pressure sensitive elements 332 are mounted on the circuit board 333. When these soft keys 331 are pressed by the user, corresponding pressing signals are generated by the pressure sensitive elements 332 and then transmitted to the circuit board 333. In response to the pressing signals, the circuit board 333 generates corresponding control signals.

Figure 5:
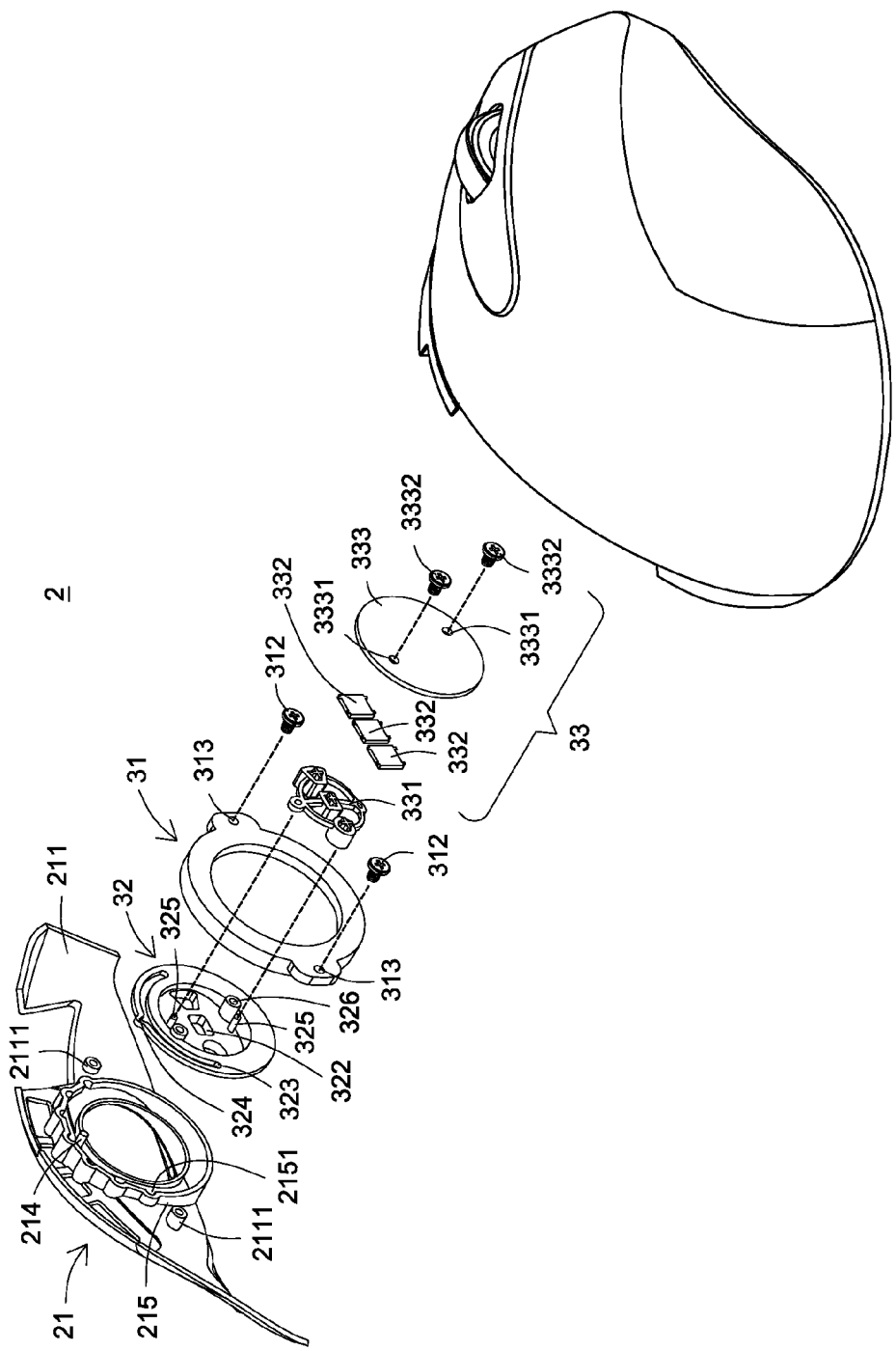
FIG. 5 is a schematic exploded view illustrating the mouse according to the first embodiment of the present invention and taken from another viewpoint.

Hereinafter, a way of fixing the signal generating module 33 on the rotary member 32 will be illustrated with reference to FIG. 5. FIG. 5 is a schematic exploded view illustrating the mouse according to the first embodiment of the present invention and taken from another viewpoint. The rotary member 32 further comprises a protrusion 325. During the assembling process, the soft key 331 is fixed on the rotary member 32 through the protrusion 325, so that the soft key 311 is rotatable with the rotary member 32. The rotary member 32 further comprises a first stud bolt hole 326. Corresponding to the first stud bolt hole 326, the circuit board 333 has an opening 3331. By penetrating a fastening element 3332 (e.g. a screw) through the opening 3331 and tightening the fastening element 3332 in the first stud bolt hole 326, the circuit board 333 is fixed on the rotary member 32, so that the circuit board 333 is rotatable with the rotary member 32. In addition, since the pressure sensitive element 332 is mounted on the circuit board 333, the pressure sensitive element 332 is also rotatable with the rotary member 32.

Please refer to FIG. 5 again. A second stud bolt hole 2111 is formed in the inner surface 211 of the sidewall 21. Corresponding to the second stud bolt hole 2111, the positioning member 31 has an opening 313. By penetrating a fastening element 312 (e.g. a screw) through the opening 313 and tightening the fastening element 312 in the second stud bolt hole 2111, the positioning member 31 is fixed on the inner surface 211 of the sidewall 21. Moreover, a retaining post 214 is formed on the inner surface 211 of the sidewall 21. The ring-shaped part 321 of the rotary member 32 comprises an arc-shaped slot 323. During the assembling process, the retaining post 214 is penetrated through the arc-shaped slot 323 for confining the rotating angle of the rotary member 32.

Figure 6A:
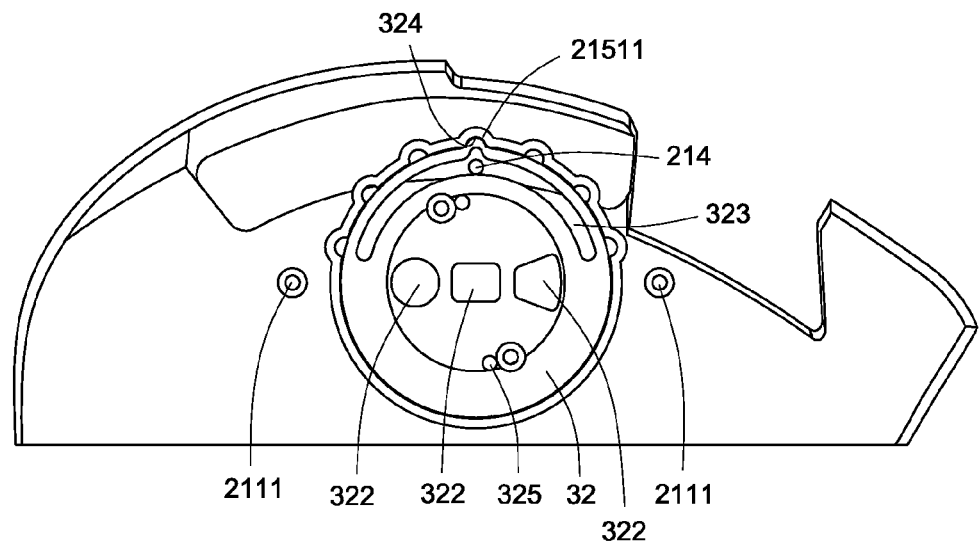
FIGS. 6A and 6B are schematic views illustrating the rotations of the operation module of the mouse according to the first embodiment of the present invention.
Figure 6B:
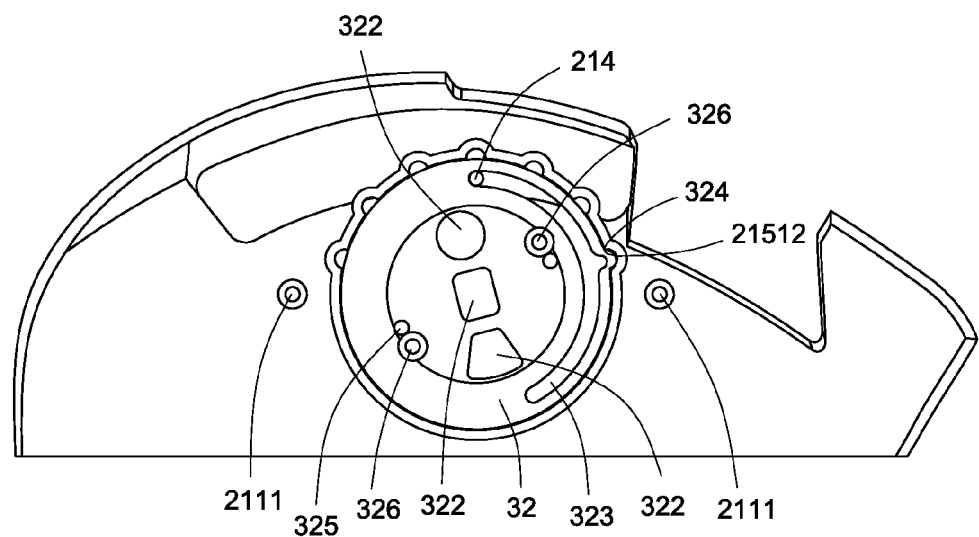

Please also refer to FIGS. 6A and 6B. A convex structure 324 is formed on a radial periphery of the rotary member 32. In addition, a ring-shaped engaging part 215 is formed on the inner surface 211 of the sidewall 21. Corresponding to the convex structure 324, the ring-shaped engaging part 215 comprises plural concave structures 2151. For using the mouse, the operation module may be rotated to a desired position complying with the usual practice of the user. For example, by rotating the rotary member 32 to render engagement between the convex structure 324 and a first concave structure 21511, the rotary member 32 is stayed at a first position (see FIG. 6A). If the rotary member 32 stayed at the first position fails to comply with the usual practice of the user, the user may continuously rotate the rotary member 32. By further rotating the rotary member 32 to render engagement between the convex structure 324 and a second concave structure 21512, the rotary member 32 is stayed at a second position (see FIG. 6B). Meanwhile, the arrangement of the soft keys 331 on the sidewall 21 when the rotary member 32 is stayed at the second position is different from the arrangement of the soft keys 331 on the sidewall 21 when the rotary member 32 is stayed at the first position. Consequently, the rotary member 32 stayed at the second position may comply with the usual practice of the user. Due to the engagement between the convex structure 324 and one of the concave structures 21511, the rotary member 32 will not be excessively and freely rotated with respect to the sidewall 21, and thus the possibility of erroneously pressing the positions of the soft keys 331 will be minimized.

Figure 7:
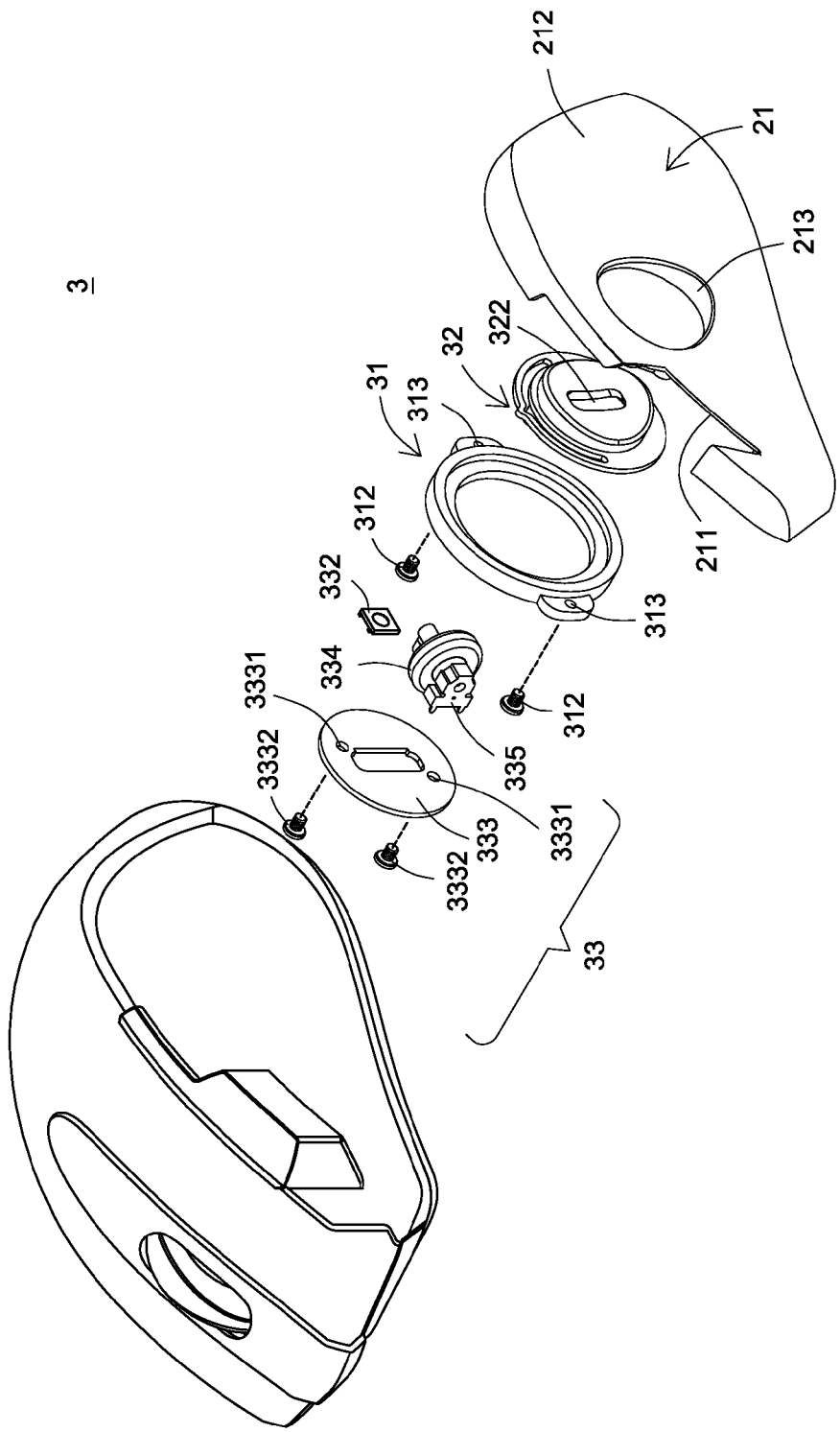
FIG. 7 is a schematic exploded view illustrating a mouse according to a second embodiment of the present invention.

FIG. 7 is a schematic exploded view illustrating a mouse according to a second embodiment of the present invention. In comparison with the present invention, the signal generating module 33 is distinguished. In this embodiment, the signal generating module 33 comprises a roller 334, a rotation sensitive element 335 and a circuit board 333. The roller 334 and the rotation sensitive element 335 are mounted on the circuit board 333. The roller 334 is exposed to the perforation 322 of the rotary member 32, so that the roller 334 can be rotated by a user's finger. In response to the rotating action of the user, the rotation sensitive element 335 generates a rotating signal, which is then transmitted to the circuit board 333. In response to the rotating signal, the circuit board 333 generates a control signal. Moreover, in the embodiment, the signal generating module 33 further comprises a pressure sensitive element 332, which is also mounted on the circuit board 333. In this situation, the roller 334 can be pressed by the user. When the roller 334 is pressed by the user, the pressure sensitive element 332 is triggered to generate a pressing signal. In response to the pressing signal, the circuit board 333 generates a control signal. The circuit board 333 is fixed on the rotary member 32, so that the circuit board 333 is rotatable with the rotary member 32. The approach of fixing the circuit board 333 on the rotary member 32 is similar to that illustrated in the first embodiment, and is not redundantly described herein. Moreover, since the roller 334, the rotation sensitive element 335 and the pressure sensitive element 332 are all mounted on the circuit board 333, the roller 334 and the rotation sensitive element 335 are rotatable with the rotary member 32.

Figure 8A:
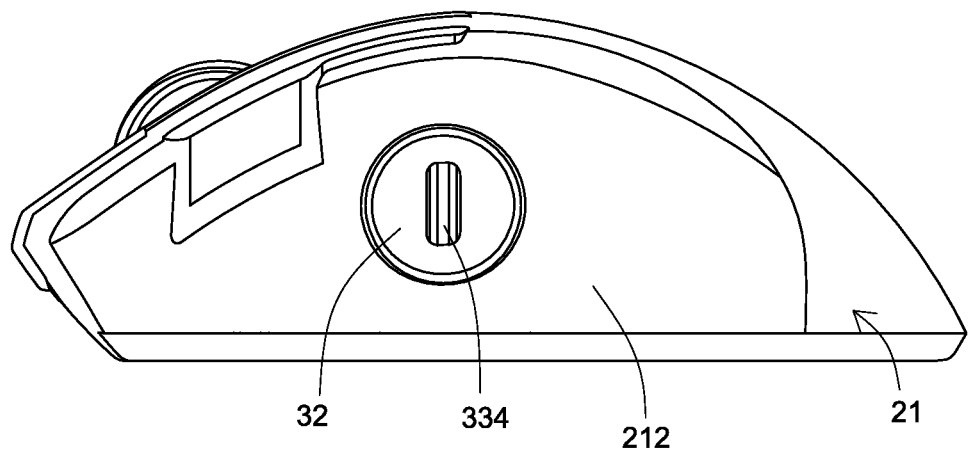
FIGS. 8A and 8B are schematic views illustrating the rotations of the operation module of the mouse according to the second embodiment of the present invention.
Figure 8B:
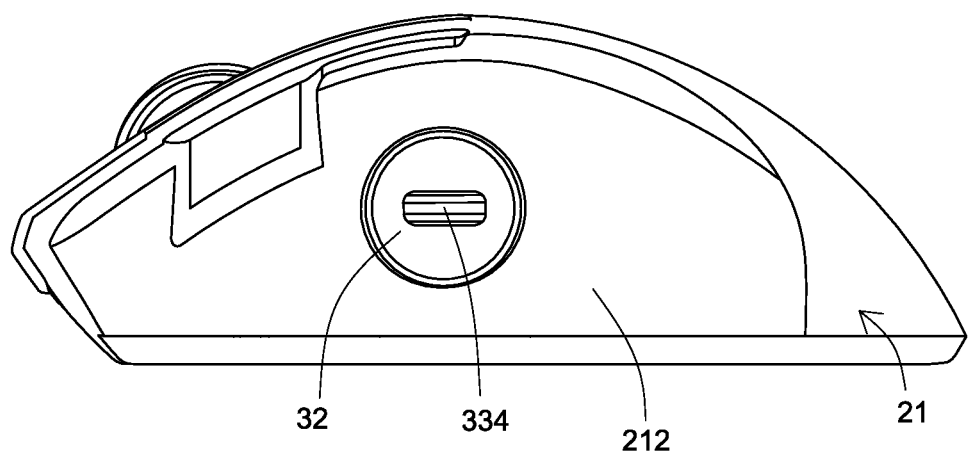

Please also refer to FIGS. 8A and 8B. In this embodiment, the user may rotate the rotary member 32 according to the usual practice of the user. By rotating the rotary member 32, the roller 334 may be adjusted to a vertical position (see FIG. 8A), a horizontal position (see FIG. 8B), or other-angular position in order comply with the usual practice of the user.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse with a rotatable operation module, said mouse comprising:
    a mouse housing having a sidewall, wherein a hollow portion is formed in said sidewall, and said sidewall includes an inner surface and an outer surface; and
    said operation module disposed on said sidewall and penetrated through said hollow portion, wherein said operation module comprises:
        a positioning member fixed on said inner surface of said sidewall;
        a rotary member disposed within said hollow portion and exposed to said outer surface of said sidewall, so that said rotary member is rotatable with respect to said sidewall; and
        a signal generating module fixed on said rotary member for generating a control signal;
        wherein said signal generating module comprises:
            a soft key to be pressed by a user; and
            a pressure sensitive element for generating a pressing signal in response to a pressing action of said user; and
        a circuit board for receiving said pressing signal, and generating a control signal in response to said pressing signal, wherein said pressure sensitive element is mounted on said circuit board; and
    wherein said rotary member further comprises a protrusion for fixing said soft key on said rotary member, so that said soft key is rotatable with said rotary member.

2. The mouse according to claim 1 wherein said positioning member and said inner surface of said sidewall collectively define a receptacle, and said rotary member further comprises a ring-shaped part, wherein said ring-shaped part is accommodated within said receptacle.

3. The mouse according to claim 1 wherein a retaining post is formed on said inner surface of said sidewall, and said rotary member comprises an arc-shaped slot, wherein said retaining post is penetrated through said arc-shaped slot for confining a rotating angle of said rotary member.

4. The mouse according to claim 1 wherein a convex structure is formed on a radial periphery of said rotary member, a ring-shaped engaging part is formed on said inner surface of said sidewall, and said ring-shaped engaging part has plural concave structures corresponding to said convex structure, wherein by rotating said rotary member to render engagement between said convex structure and one of said concave structures, said rotary member is stayed at a specified position.

5. The mouse according to claim 1 wherein said rotary member further comprises a perforation, wherein said signal generating module is exposed to said perforation, so that said signal generating module is operable by a user.

6. The mouse according to claim 1 wherein said rotary member further comprises a stud bolt hole, and said circuit board has an opening corresponding to said stud bolt hole, wherein by penetrating a fastening element through said opening of said circuit board and tightening said fastening element in said stud bolt hole, said circuit board is fixed on said rotary member, so that said circuit board is rotatable with said rotary member.

7. A mouse with a rotatable operation module, said mouse comprising:
    a mouse housing having a sidewall, wherein a hollow portion is formed in said sidewall, and said sidewall includes an inner surface and an outer surface; and
    said operation module disposed on said sidewall and penetrated through said hollow portion, wherein said operation module comprises:
        a positioning member fixed on said inner surface of said sidewall;
        a rotary member disposed within said hollow portion and exposed to said outer surface of said sidewall, so that said rotary member is rotatable with respect to said sidewall:
        a signal generating module fixed on said rotary member for generating a control signal; wherein said signal generating module comprises;
            a roller to be rotated by a user's finger;
            a rotation sensitive element for generating a rotating signal in response to a rotating action of said user's finger; and
            a circuit board for receiving said rotating signal, and generating a control signal in response to said rotating signal, wherein said roller and said rotation sensitive element are mounted on said circuit board; and
    wherein said rotary member further comprises a stud bolt hole, and said circuit board has an opening corresponding to said stud bolt hole, wherein by penetrating a fastening element through said opening of said circuit board and tightening said fastening element in said stud bolt hole, said circuit board is fixed on said rotary member, so that said circuit board is rotatable with said rotary member.

* * * * *